United States Patent
Wang et al.

(10) Patent No.: US 8,064,407 B2
(45) Date of Patent: Nov. 22, 2011

(54) METHOD AND EQUIPMENT FOR REALIZING SMART ANTENNA IN WCDMA SYSTEM

(75) Inventors: Yanwen Wang, Shenzhen (CN); Li Zhang, Shenzhen (CN); Dongli Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1113 days.

(21) Appl. No.: 11/885,595

(22) PCT Filed: Dec. 29, 2005

(86) PCT No.: PCT/CN2005/002361
§ 371 (c)(1), (2), (4) Date: Sep. 4, 2007

(87) PCT Pub. No.: WO2006/092090
PCT Pub. Date: Sep. 8, 2006

(65) Prior Publication Data
US 2008/0170554 A1    Jul. 17, 2008

(30) Foreign Application Priority Data
Mar. 2, 2005 (CN) .......................... 2005 1 0051164

(51) Int. Cl.
*H04W 4/00* (2009.01)
*H04B 7/216* (2006.01)

(52) U.S. Cl. ..... 370/334; 370/335; 370/342; 455/562.1; 342/373; 375/347

(58) Field of Classification Search .................. 370/235, 370/252, 334–337, 341–344, 310, 321, 328, 370/330, 332; 455/501, 506, 561, 562, 562.1, 455/13.3, 25, 63.1, 63.4, 65, 67.13, 82, 114.1, 455/135, 161.3, 277.2, 278, 278.1, 296, 452.1, 455/517, 575.7; 342/171–172, 368–374, 342/378, 379; 375/219, 295, 296, 299, 316, 375/345, 347–349
See application file for complete search history.

(56) References Cited

U.S. PATENT DOCUMENTS

| | | | |
|---|---|---|---|
| 6,937,189 B2 * | 8/2005 | Kim | 342/372 |
| 2003/0201936 A1 | 10/2003 | Kim | |
| 2003/0216156 A1 * | 11/2003 | Chun | 455/562.1 |

OTHER PUBLICATIONS

Karasawa et al, "Algorithm Diversity in Software Antenna", IEICE Trans. Commun., Jun. 2000.*
Karasawa et al. "Algorithm Diversity in a Software Antenna" IEICE Trans. Commun., vol. E83-B, No. 6, Jun. 2000.
Kamiya et al. "A Software Antenna: Reconfigurable Adaptive Arrays Based on Eigenvalue Decomposition", IEICE Trans. Commun., vol. E82-B, No. 12, Dec. 1999.
International Search Report. Dated Nov. 18, 2009.

* cited by examiner

*Primary Examiner* — Aung S Moe
*Assistant Examiner* — Habte Mered
(74) *Attorney, Agent, or Firm* — Michael Ye; Andrews Kurth LLP

(57) ABSTRACT

A method and device for realizing smart antenna in WCDMA system are disclosed in the invention, including array antenna, radio frequency channel module, beam forming module, channel environment detection and classification module, beam-forming algorithm selection and weight value generation module. After processing the signals received by the antenna array in RF channel, the baseband array data X including multiple components is obtained, then the channel environment is estimated and identified according to the characteristics of said array data, and the channel type which the channel belongs to is determined; the corresponding adaptive beam forming algorithm is selected according to the identification result of the channel type, so as to calculate the uplink weight value W including multiple components; said array data X and weight value W are multiplied so as to form beam Y. The invention can adopt corresponding adaptive beam forming algorithm based on the channel environments, thus it can effectively restrain the interference under various channel environments.

22 Claims, 3 Drawing Sheets

METHOD AND EQUIPMENT FOR REALIZING SMART ANTENNA IN WCDMA SYSTEM

TECHNICAL FIELD

The present invention relates to smart antenna technique in wideband code division multiple access (WCDMA) system in communication field, in particularly, to a method and device for implementing smart antenna in WCDMA system.

BACKGROUND ART

In WCDMA communication channel, in addition to the Additive White Gaussian Noise (AWGN), there are various interferences in different environments, so the design of a receiver must take the restraint of interferences into consideration. Under the ideal AWGN environment, a matched filter de-spreader (or called a correlated de-spreader) can be used. In the case of multi-paths interferences, Rake multi-paths diversity de-spread receiver is often used, which needs to estimate the delay and amplitude of the multi-paths. In the channel having narrowband interference, the common used method is to add an adaptive prediction filter in front of the matched filter to estimate the narrowband interference and realize the separation from the wideband spread signals. In the WCDMA system with multi-access interferences, multi-user detection receiver ever received wide attention. It consists of a set of matched filters and a multi-user detector, the typical one is a de-correlated multi-user detector, which has linear complexity and the best ability to suppress the near-far effect. But its disadvantage is needing various information (such as pseudo code, timing, phrase etc.) of all the interference users.

In the method above, the suppression for various interferences is usually performed separately. However, we actually often face with the following two conditions: 1) we may not know which kind of interference environment located in, and also don't clear about the interference parameters; 2) sometimes, there may be various interferences existing at the same time. Under such conditions, the receiver that can suppress one kind of interference may not work normally when under the channel environment in which another kind of interference or various interferences existing simultaneously. There is also a method of combining narrowband notch filter, Rake receiver, and de-correlated multi-user detector. But its disadvantage is that the receiver is extremely complex and even can not be implemented.

The baseband model of BPSK modulation DS/CDMA receiving signal in complex channel environment will be discussed first herein. Spread spectrum modulation and multipath effect use the FIR filter to set up the model. There exists multi access interference, multipath interference, narrowband interference and AWGN. There are K users in the system, the data sequence of each user is $d_k(n) \in \pm 1$, $c_k$ and $h_k$ are the coefficients of FIR filter. Filter $c_k$ completes the function of spread spectrum modulation, with its input being $d_k(n)\delta(n-T_b)$, provided $c_k=[c_{k,0}, c_{k,1}, \ldots, c_{k,N-1}]^T$ represents the spread spectrum pseudo code sequence of $k^{th}$ user with its value of $\pm 1$, then the impulse response of the filter equals to this spread spectrum pseudo code sequence $c_k$, $h_k$ represents the effect of the multipath interference. Provided the multi-path delay is the integral times of code-chip period $T_c$, $\tau_k T_c$ represents LoS (line of sight) path time delay of $k^{th}$ user, provided the maximum number of multipaths is L, the time delay of each path of $k^{th}$ user is: $\tau_k T_c$, $(\tau_k+1)T_c, \ldots, (\tau_k+L-1)T_c$ respectively, and the fading coefficient is denoted by the vector $h_k=[h_{k,0}, h_{k,1}, \ldots, h_{k,L-1}]^T$, for the user with the number of the multipaths less than L, some elements of $h_k$ are zero.

Provided the first user is the expected user, and $\tau_k > \tau_1$, (k=2, ..., K), make $$m_{k,l} = \text{int}[\tau_k + l - \tau_1)/N]$$

$$q_{k,l} = \tau_k + l - \tau_1 - N \cdot m_{k,l}$$

The above two equations illustrate how many data code cell periods the $l^{th}$ path of $k^{th}$ user delays relative to the LoS path of the first user, $m_{k,l}$ is the integer part, $q_{k,l}$ is the residue.

If narrowband interference is not considered, the vector of the received signal is represented as:

$$x[n] = h_{1,0}d_1(n)c_1 + \sum_{l=1}^{L-1}[h_{1,l}d_1(n-m_{1,l}-1)cf_{1,l} + h_{1,l}d_1(n-m_{1,l})cb_{1,l}] + \sum_{k=2}^{K}\sum_{l=0}^{L-1}[h_{k,l}d_k(n-m_{k,l}-1)cf_{k,l} + h_{k,l}d_k(n-m_{k,l})cb_{k,l}] + z(n)$$

Wherein:

$$cf_{k,l} = [c_{k,N-q_{k,l}}c_{k,N-q_{k,l}-1}, \ldots, c_{k,N-1}, 0, \ldots, 0]_{1 \times N}^T,$$

$$cb_{k,l} = [0, \ldots, 0, c_{k,0}, c_{k,1}, \ldots, c_{k,N-q_{k,l}-1}]_{1 \times N}^T$$

The first item in the equation is the LoS path signal of the expected user, the second is the multipath interference generated by the expected user, the third is the multi access interference, the multipath interference generated by multi access user is equivalent to multi access interference, i.e. equivalent to the multi access interference of item (k–1)l, the fourth item is AWGN interference.

Usually, in the base station of WCDMA system, the receiver often adopts correlated receiving or Rake receiving technique, which is the processing method for single user. From the view point of information theory, WCDMA is a MIMO channel, and single user can not make full use of the channel capacity. Multi-user detection can make full use of the time domain information of the multi-user, such as codeword, amplitude, timing, and delay etc., and thus reduce the multipath multi-access interference greatly. Smart antenna technique is on the basis of adaptive antenna and high resolution array signal processing, and makes it possible for the receiver to capture the space domain information of multi-user signal. Such space information includes parameters such as arriving angle, the number of signals, the way of signal polarization, and the relative phase relationship etc.

In order to make full use of the features of the space domain and time domain of the signals, it is necessary to perform space-time associated processing for the signals. The method of space-time associated processing includes the method based on some space-time optimization criterions and the method based on some structure characteristics. In order to make full use of various methods in various conditions, the space-time processing can be combined into software radio architecture, that is to say, space-time associated processing is implemented with software, it is to construct a generalized space-time associated processing method suitable to various channel conditions.

The adaptive smart antenna currently used, such as the ones disclosed in China patent application 01132304 "A Receiving Device with Full Adaptive Smart", China patent application 01131993 "A Receiving Method and Device with Smart Antenna", the weight value can be updated by certain criterions according to the changes of the distribution characteristics of signal space, the amplitude and phase of the weight value can be updated freely, when the update algorithm is convergent, this method can make full use of the space features of the expected user signal and interference signal to maximum the SIR (signal interference ratio) of the received signal.

However, there are some key technique problems to be solved when applying the adaptive smart antenna in practice. Wherein, the steadiness and the complexity of the calculation of adaptive beam forming algorithm is one of the problems that limit the development of adaptive antenna. In practical communication, the channel condition is very complex and has the characteristic of time-varying, so it is difficult to use single certain adaptive beam forming algorithm to perform well in all kinds of environments. In the above patents relating to adaptive smart antenna, they either only advance the function that the system realizes without specific implementing method, or provide algorithms that have limitations in application environment. That is also one of the prime reasons why no WCDMA adaptive smart antenna products have appeared till now despite there are many patens and researches on this field.

DISCLOSURE OF THE INVENTION

The purpose of the invention is to advance a method for implementing WCDMA smart antenna, wherein corresponding adaptive beam forming algorithm is adopted according to different channel environments, so that the interference is restrained effectively under various channel environments. The invention also provides a smart antenna device for realizing the method.

In order to solve the problem above, a method for implementing WCDMA smart antenna is provided by the invention, comprising the following steps:

(a) the signals received by antenna array are processed in RF (radio frequency) channel to get baseband array data containing a plurality of components;

(b) the channel environment is estimated and identified according to the characteristics of said array data, and the channel type that the channel belongs to currently is determined by a set decision criterion for channel type;

(c) a corresponding adaptive beam forming algorithm is selected in real time according to the identification result of the channel type, and the uplink weight value is calculated;

(d) said array data and said uplink weight value are multiplied and then added to form beam.

Further, the implementation method above can also have the following feature: in said decision criterion for channel type, the channel types are divided into the following three kinds or any combination thereof: first, AWGN is the main part of interference, the environment located in is far away from base station, signal power is weak and noise is strong; second, co-channel interference is the main part of interference, the environment located in is interfered by co-channel from other cells; third, the ISI (inter symbol interference) is the main part of interference, the environment located in has severe ISI due to the great difference of time delays between each of the multi-path components.

Further, the implementation method above can also have the following feature: said decision criterion for channel type determines the channel type according to in-band power spectrum deviation and eigenvalue of the correlation matrix of said array data, which includes any combination of the following three or at least two criterions:

if the number of effective eigenvalues is 1, and the in-band power spectrum deviation is small, it is said first channel type;

if the number of effective eigenvalues is 1, and the in-band power spectrum deviation is large, it is said second channel type;

if the number of effective eigenvalues is larger than 1, and the in-band power spectrum deviation is small, it is said third channel type.

Further, the implementation method above can also have the following feature: in said step (c) of selecting the corresponding adaptive beam forming algorithm according to the identification result of the channel type, it follows any combination of the following three or at least two criterions:

for the first channel type with AWGN being the main part of interference, Maximal Ratio Combing beam forming algorithm is adopted;

for the second channel type with co-channel interference being the main part of interference, Advanced Constant Modulus algorithm (CAM) for beam forming is adopted;

for the third channel type with ISI being the main part of interference, advanced concatenated recursive beam forming algorithm is adopted.

Further, the implementation method above can also have the following feature: said step (d) is further followed by a step (e): the corresponding multi-user detection algorithm is selected in real time to process the data after beam forming according to the identification result of channel type, the distinction of users is completed.

Further, the implementation method above can also have the following feature: in said step (e) of selecting the corresponding multi-user detection algorithm according to the identification result of channel type, it follows any combination of the following four or at least two criterions:

for the first channel type with AWGN being the main part of interference, the minimum mean square based multi-user detection method is adopted;

for the second channel type with co-channel interference being the main part of interference, de-correlation detection method is adopted;

for the third channel type with ISI being the main part of interference, parallel interference counteraction method is adopted.

Further, the implementation method above can also have the following feature: the decision criterion for channel type set in said step (a) further includes a fourth channel type, in which, there are various interferences and noises, the environment located in is complex communication environment with strong noise and both co-channel interference and ISI, the corresponding decision condition is: the number of effective eigenvalues is greater than 1, and in-band power deviation is large; in said step (c) of selecting corresponding adaptive beam forming algorithm according to the identification result of channel type, pilot-bits assisted beam forming algorithm is adopted for this fourth channel type.

Further, the implementation method above can also have the following feature: said step (d) is further followed by a step (e): the corresponding multi-user detection algorithm is selected in real time to process the data after beam forming according to the identification result of channel type, distinction of users is completed; and for the fourth channel type with various interferences and noises, partial multi-access interference cancellation method is used as multi-user detection algorithm.

Further, the implementation method above can also have the following feature: when said in-band power deviation is larger than a set threshold, the in-band power deviation is considered to be large, otherwise, it is considered to be small.

Further, the implementation method above can also have the following feature: said step (e) is further followed by a step (f): downlink weight value is calculated according to the obtained uplink weight value.

The smart antenna device of WCDMA system provided by the invention comprises a smart antenna device of WCDMA system, including: an array antenna, a radio frequency (RF) channel module, and a beam forming module for forming the beam after weighting the signals of each single channel, characterized in further including a channel environment detection and classification module, a beam forming algorithm selection and weight value generation module, wherein:

said channel environment detection and classification module is used to estimate and identify the channel environment according to the characteristics of the baseband array data received from said RF channel, determine the current channel type, and output the result to said beam forming algorithm selection and weight value generation module;

said beam forming algorithm selection and weight value generation module is used to select corresponding beam forming algorithm according to the identification result of channel type, to calculate the new uplink weight value according to said array data and the feedback of beam forming signal, and send the new uplink weight value to said beam forming module.

Further, the smart antenna device above can also have the following feature: a multi-user detection module is further included, for selecting the corresponding multi-user detection algorithm according to the identification result of the channel type, processing said beam forming signal, and completing distinction of users.

Further, the smart antenna device above can also have the following feature: said channel environment detection and classification module further includes: an eigenvalue calculation unit, for calculating the eigenvalue of the correlation matrix of the array data and counting the number of the effective eigenvalues; an in-band power spectrum deviation calculation unit, for estimating the power of each channel of the signals received by the array and calculating the in-band power spectrum deviation; and a channel type decision unit, for identifying the type that the channel belongs to currently by the set decision criterion according to the number of the effective eigenvalues and the in-band power spectrum deviation.

Further, the smart antenna device above can also have the following feature: when said channel type decision unit identifies the type that the channel belongs to currently according to the number of the effective eigenvalues and the in-band power spectrum deviation, it follows any combination of the following three or at least two criterions:

if the number of eigenvalues is 1, and the in-band power spectrum deviation is small, it is said first channel type, in which, AWGN is the main part of interference, the environment located in is far away from base station, signal power is weak and noise is strong;

if the number of eigenvalues is 1, and the in-band power spectrum deviation is large, it is said second channel type, in which, co-channel interference is the main part of interference, the environment located in is interfered by co-channel from other cells;

if the number of effective eigenvalues is larger than 1, and the in-band power spectrum deviation is small, it is said third channel type, in which, ISI is the main part of interference, the environment located in has severe ISI due to the great difference of time delays between each of the multipath components.

Further, the smart antenna device above can also have the following feature: when said multi-user detection module selects the corresponding multi-user detection algorithm according to the identification result of the channel type, it follows any combination of the following three or at least two criterions:

for the first channel type with AWGN being the main part of interference, the minimum mean square based multi-user detection method is adopted;

for the second channel type with co-channel interference being the main part of interference, de-correlation detection method is adopted;

for the third channel type with ISI being the main part of interference, parallel interference counteraction method is adopted.

Further, the smart antenna device above can also have the following feature: when said channel type decision unit identifies the type that the channel belongs to currently according to the number of the effective eigenvalues and the in-band power spectrum deviation, it follows the following criterions:

the number of the effective eigenvalues is greater than 1, and the in-band power deviation is large, it is the fourth channel type, in which, there are various interferences and noises, the environment located in is complex communication environment with strong noise and both co-channel interference and ISI;

when said multi-user detection module selects the corresponding multi-user detection algorithm according to the identification result of the channel type, partial multi-access interference cancellation method is used for the fourth channel type.

From above, it can be seen that this invention adopts suitable adaptive beam forming algorithm for smart antenna according to different channels, so it has many advantages compared with existing adaptive beam forming algorithms:

First, the suitable corresponding beam forming algorithm is selected by analyzing the characteristics of the channel, so that the base station of smart antenna has more extensive adaptability, and the limitation of one single adaptive beam forming algorithm is avoided.

Second, the beam forming algorithm and multi-user detection algorithm based on software radio technique are adopted, so that the algorithms switch compactly and calculate rapidly, the difficulty of hardware implementation is reduced, engineering is easy to be realized and the upgrade and maintenance of base station system also becomes easy.

Third, the algorithm can trace the Direction of Arrive (DOA), adjust weight vector adaptively, and form beam maximum steering in the DOA of the expected user, and form Null steering in the direction of interference user, so that the influence of interference is suppressed effectively.

Fourth, the partial multi-user cancellation method adopted reduces the buffer space and the calculation amount of the system, and avoids the decrease of the system performance due to inaccurate estimation of weak multi-access interference component, so as to make the system have better stability.

To sum up, by using the smart antenna system implemented by the method of this invention, the performance-price ratio of smart antenna base station system can be greatly promoted with low expense of hardware, the engineering can be implemented conveniently, and the performance of smart base station processing can be improved greatly.

BEST EMBODIMENT OF THE INVENTION

Figure 1:
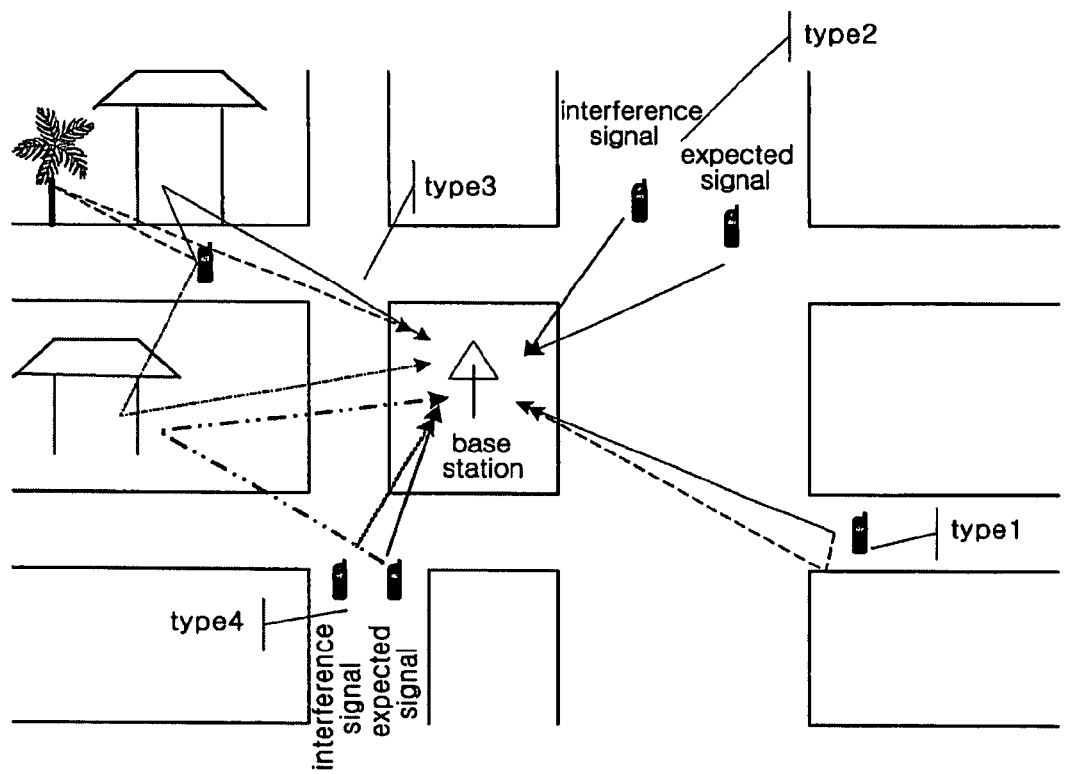
FIG. 1 is a drawing of an example of the practical communication environment.

As shown in FIG. 1, according to the different wireless communication environments, the channel types are classified into four kinds in this embodiment: first, AWGN is the main part of the interference, the environment located in is far away from base station, signal power is weak and noise is strong; second, co-channel interference is the main part of the interference, the environment located in is interfered by co-channel from other cells, the performance of the system is affected; third, the ISI is the main part of the interference, the environment located in has severe ISI due to the great difference of time delays between each of the multipath components; fourth, there are various kinds of interferences and noises, the environment located in is complex communication environment with strong noise and both co-channel interference and ISI. Certainly, other classifications of channel types can also be used, this invention is not limited by this.

This embodiment determines the channel types according to the eigenvalues of the correlation matrix of the signal received by the array and the in-band power spectrum deviation; the beam forming algorithms, such as Maximal Ratio Combining, Advanced Constant Modulus, Advanced Wiener, and partial multi-access interference cancellation etc. are adopted respectively in regards to the different types of channel; afterwards, corresponding multi-user detection is applied. Thus, the smart antenna base station has more extensive adaptability.

In the following, the implementation of the technical scheme will be further discussed with respect to the attached drawings. The skilled in this art can easily implement these modules according to the structural drawing.

Figure 2:
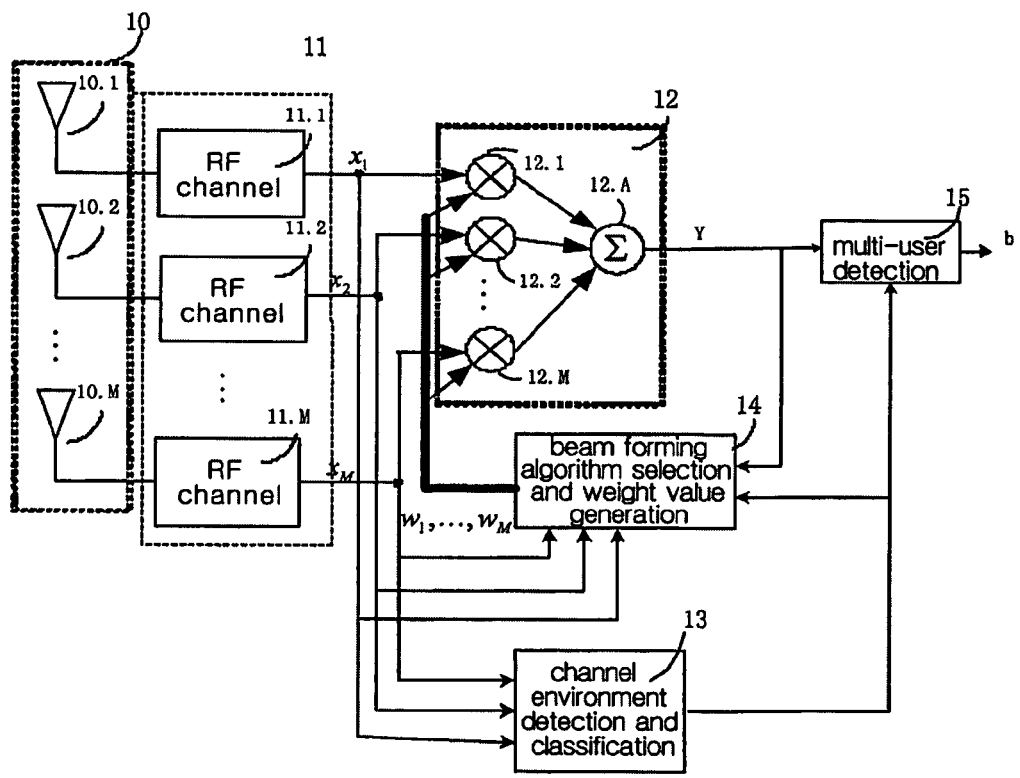
FIG. 2 is a structural drawing of the smart antenna device according to the embodiment of the invention.

FIG. 2 is the structural drawing of the smart antenna device in accordance with the embodiment of the invention, including antenna array 10, RF channel module 11, beam forming module 12, channel environment detection and classification module 13, beam forming algorithm selection and weight value generation module 14, and multi-user detection module 15. Since the functions of modules of scrambling generation, spread spectrum code generation, code synchronization, descrambling de-spread, clock control etc. in software radio smart antenna system are not the content that this invention focuses on, these modules will not be described in the embodiment. These modules or their output signals will be referred to directly if needed.

Antenna array 10 is consisted of M antenna elements, i.e. 10.1, 10.2, . . . , 10.M, used to receive wireless signals. Its output is connected to the input of RF channel module 11. The radiation pattern of the antenna elements can be arbitrary, the arrangement of the antenna array can be arbitrary as well. The adaptive method of the invention will obtain the optimal array weight value under certain criterion. But in the case of different antenna arrays, the receiving quality of the optimal signal that can be reached is different.

RF channel module 11 includes M RF channels, i.e. 11.1, 11.2, . . . , 11.M, used to perform low noise amplification, automatic gain control, channel correction, baseband transfer, A/D and D/A transfer, matched filtering and so on for the signals output by M antenna elements respectively. The signals have been discretized in RF channel, and are outputted as M streams of baseband signals $X=[x_1, x_2 \ldots, x_M]$, called array data X as well hereinafter. All the follow-up processing is digital signal processing performed by software. The array data X is output to beam forming module 12, channel environment detection and classification module 13, and beam forming algorithm selection and weight value generation module 14 respectively.

Said channel environment detection and classification module 13 further includes: an eigenvalue calculation unit, used to calculate the eigenvalue of the correlation matrix of the array data, and count the number of the effective eigenvalues; an in-band power spectrum devistion calculation unit, used to estimate the power of each channel of the signals received by the array, and calculate the in-band power spectrum deviation; and a channel type decision unit, used to identify the type that the channel belongs to currently by a set decision criterion according to the number of the effective eigenvalues and the in-band power spectrum deviation, and input the result to the beam forming algorithm selection and weight value generation module 14. Said channel type is one of AWGN interference, co-channel interference, ISI, and various interferences and noises.

The beam forming algorithm selection and weight value generation module 14 is used to select suitable beam forming algorithm according to the result of channel type output by the channel environment detection and classification module 13, process the array data X from RF channel 11 and the feedback signal Y output by the beam forming module 12, and calculate the new weight value W to be output to the beam forming module. The new weight value $W=[w_1, w_2, \ldots, w_M]$ is made up of M components.

The beam forming module 12 is consisted of M multipliers 12.1, 12.2, . . . , 12.M and one adder 12.A. It is used to form the beam for the array data X from RF channel module 11 and the weight value W output by the beam forming algorithm selection and weight value generation module 14, i.e. obtain the output signal Y by multiplying and adding the array data X and weight value W.

The multi-user detection module 15 is used to select corresponding multi-user detection algorithm according to the result of channel type output by the channel environment detection and classification module 13, process the data Y output by the beam forming module 12, complete distinction of users, and finally output a modulated output bit "b" to the other follow-up conventional processing modules.

The beam forming module 12, channel environment detection and classification module 13, beam forming algorithm selection and weight value generation module 14, and multi-user detection module 15 in the embodiment are realized by software in DSP. But they can also be hardware modules, that is to say, these modules can be made on specialized ASIC or FPGA.

Figure 3:
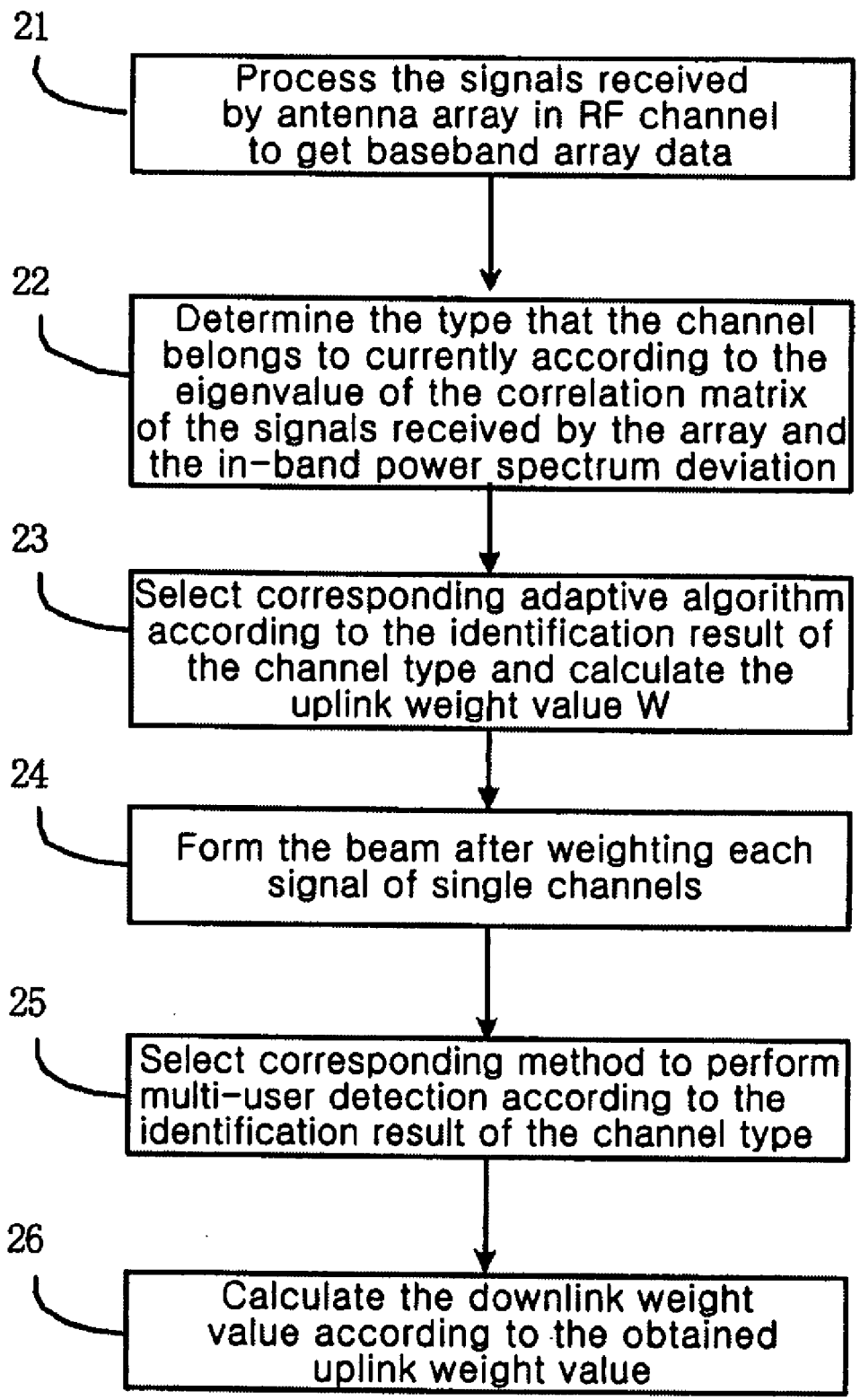
FIG. 3 is a flow chart of the method according to the embodiment of the invention.
Figure 4:
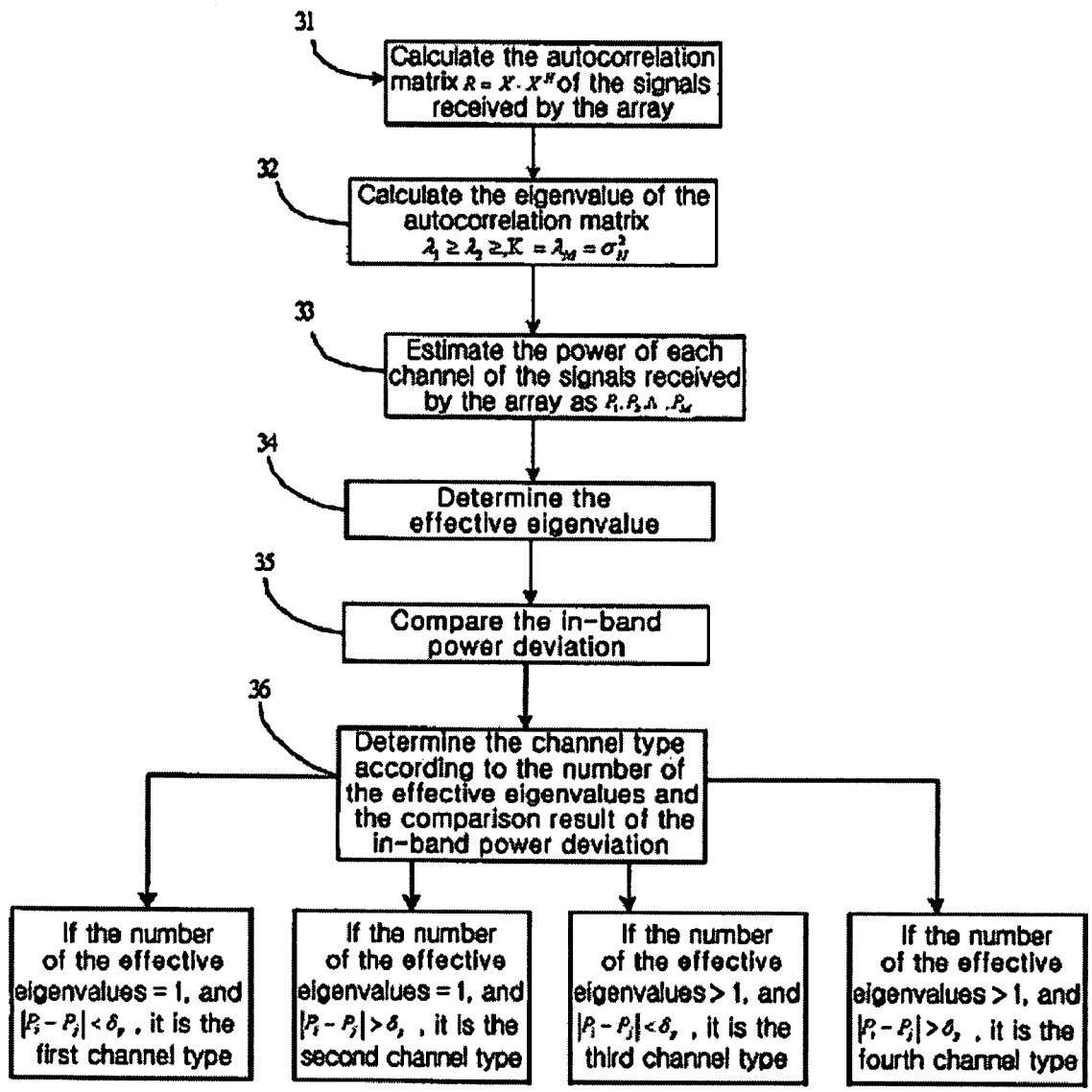
FIG. 4 is a flow chart of wireless communication environment detection and channel identification according to FIG. 3.

FIG. 2 is the flow chart of the method in accordance with the embodiment of the invention, including the following steps:

Step 21, processing the signals received by the antenna array in RF channel to get baseband array data $X=[x_1, x_2, \ldots, x_M]$;

Step 22, determining the type that the channel belongs to currently by the set decision criterion according to the eigenvalue of the correlation matrix of the signals received by the array and the in-band power spectrum deviation;

The specific flow of wireless communication environment detection and channel identification is shown in FIG. 3, including the following steps:

Step 31, calculating the autocorrelation matrix $R=X \cdot X^H$ of the signals received by the array;

Step 32, calculating eigenvalue $\lambda$ with respect to the eigenvector V according to the equation: $R \cdot V = \lambda \cdot V$ $\lambda_1 \geq \lambda_2 \geq , \ldots = \lambda_M = \sigma_N^2$, wherein $\sigma_N^2$ is noise power.

Step 33, estimating the power of each channel of the signals received by the array as $P_1, P_2, \ldots, P_M$;

Step 34, determining the effective eigenvalue, provided $\sigma_N^2$ is noise power, if $\lambda \geq \sigma_N^2 + \delta_\lambda$, $\lambda$ is regarded as the effective eigenvalue, wherein $\delta_\lambda$ is the specific parameter determined by the practical system;

Step 35, comparing the in-band power deviation, i.e. deciding whether $|P_i - P_j| < \delta_p$ is satisfied, wherein i, j=1, 2, ... M, and i≠j, $\delta_p$ is a threshold; according to the specific parameter determined by the practical system, if it is satisfied, the power is considered to be relatively small, otherwise, the power is considered to be relatively large.

Step 36, deciding the type that the channel belongs to currently according to the number of the effective eigenvalues and the comparison result of the in-band power deviation, the criterion is as follows:

if the number of the effective eigenvalues is 1, and the in-band power deviation is small, there are only the expected signals and AWGN in the channel, the time delay expansion is small, then it is the first channel type;

if the number of the effective eigenvalues is 1, and the in-band power deviation is large, there are both the expected signals and interference signals in the channel, but the time delay expansion is not large and there is certain angle expansion, the co-channel interference is mainly presented, then it is the second channel type;

if the number of the effective eigenvalues is larger than 1, and the in-band power deviation is small, the time delay expansion of the expected signals is large, the angle expansion is small, ISI is mainly presented, then it is the third channel type;

if the number of the effective eigenvalues is larger than 1, and the in-band power deviation is large, both the expected signals and interference signals have certain time delay expansion and angle expansion, then it is the fourth channel type.

This invention can also adopt other suitable decision criterions, such as adopt any combination of more than two criterions selected from the above four criterions. Of course, the channel types shall also be re-combined accordingly.

Step 23, selecting the corresponding adaptive algorithm according to the identification result of channel type to eliminate the interference under this kind of channel type most effectively, and calculating the uplink weight value W;

For the first channel type with AWGN being the main part of interference, Maximal Ratio combining algorithm is used in the embodiment to calculate the uplink weight value W. The method is used widely, and will not be discussed in detail herein.

For the second channel type with co-channel interference being the main part of interference, Advanced Constant Modulus Algorithm (CMA) for beam forming is used in the embodiment to calculate the uplink weight value W.

The main process of the Advanced CMA for beam forming used in this embodiment is as follows:

The original weight value of CMA, $W_0 = (X \cdot X^H)^{-1} \cdot X \cdot d^H$, is obtained according to Wiener solution, wherein d is reference signal, $X \cdot X^H = R$ is the autocorrelation matrix of the signals received by the array, the value of R has been calculated when identifying the channel, so it can be used directly.

The cost function of the implementation method of steepest-descending Constant Modulus is:

$$J = E\{||w^H(n)x(n)| - |\alpha||^2\}$$

Wherein, $\alpha = W_0^H \cdot X(0)$, update direction selection iterative formula:

$$w(n+1) = w(n) - \mu x(n)e^*(n)$$

In the formula, $$e(n) = 2\left[y(n) - \frac{y(n)}{|y(n)|}\right],$$

$\mu$ is the step length.

Concerning other related contents, please refer to the advanced CMA disclosed in "*A combination of two adaptive algorithm SMI and CMA*", issued on Rumiko YONEZAWA, IEICE TRANS. COMMUM., VOL. E84-B, No. 7 Jul. 2001. This invention only makes the above partial improvement for this disclosed algorithm.

For the third channel type with ISI being the main part of the interference, the embodiment adopts concatenated recursive beam forming algorithm to calculate the uplink weight value W, for which please refer to the international patent application of PCT/CN2002/000946, titled "Smart antenna and beam forming method and device", with international publication No. WO2004/030239A1.

For the fourth channel type with various interferences and noises, the embodiment adopts pilot-bit assisted LMS_DRMTA (Least-Mean-Squares De-spread Re-spread Multi-Target Array) beam forming algorithm to calculate the uplink weight value W.

The main process of pilot-bit assisted LMS_DRMTA beam forming algorithm is as follows:

Step I, initializing the received weight vector of the array of $i^{th}$ user as $[1, 0, \ldots 0]^T$;

Step II, updating the weight value according to the following equation (1) during pilot-bit (with its length less than or equal to 8), and generating reference signals by the following equation (2).

$$\begin{cases} Y_i(j) = [W_i^H X(j)]^T = [y_i(1+jK), y_i(2+jK), \ldots, y_i(K+jK)]^T; \\ \hat{b}_i(j) = \text{sgn}\left\{\text{Im}\left(\sum_{k=1+jK}^{(j+1)K} y_i(k)c_i(k)\right)\right\}; \\ r_i(j) = \hat{b}_i(j)[c_i(1+jK), c_i(2+jK), \ldots, c_i(K+jK)]; \\ W_i(j+1) = [X(j)X(j)^H]^{-1} X(j) r_i^*(j). \end{cases} \quad (1)$$

$$r_i(j) = b_{pilot}(j)[c_i(1+jK), c_i(2+jK), \ldots, c_i(K+jK)]. \quad (2)$$

wherein, $K = N_c \cdot N_s$, $N_c$ is spread spectrum gain, $N_s$ is oversample multiple.

Step III, during information code stream, the weight vector generated in the steps above is used as initial value, generating the reference signal by the equation (1), and updating by the following method:

$$W_i(j+1) = W_i(j) + \mu X(j) E_i(j+1)^H. \quad (3)$$

$$E_i(j) = r_i(j) - Y_i(j)$$

wherein, $\mu$ represents step length; $[X(j)]_{N \times P}$ represents the received vector of the array of current information bit; $[r_i(j)]_{1 \times P}$ is the reference signal generated by the equation (1); $[E_i(j)]_{1 \times P}$ represents the correction error vector of the weight vector of the current information bit; $[Y_i(j)]_{1 \times P}$ is the array output of P snapshots of the current information bit;

Step IV, repeating steps II-III until the algorithm converges.

For the other related contents, please refer to the international patent application of PCT/CN02/00947, titled "Smart antenna and adaptive beam forming method and device thereof". This invention only makes the above partial improvement for the disclosed algorithm.

Step 24, forming the beam $Y=W^H \cdot X$ after weighting each signal of single channels;

Step 25, selecting corresponding method to perform multi-user detection according to the identification result of the channel type;

The detected channel environment data is also used to select multi-user detection type, so as to eliminate the interference of this channel type most effectively.

For the first channel type, Minimum Mean Square based multi-user detection method is used to counteract AWGN;

For the second channel type, the de-correlation detection method is used to counteract CCI;

For the third channel type, parallel interference counteraction method is used for multi-user detection.

During a call, if a mobile station moves to the first channel type from the third channel type through the second channel type, the corresponding different methods above are adopted in real time to perform multi-user detection according to the identification result.

The environment in which the fourth channel is located is complex communication environment, for which, this embodiment uses partial multi-access interference cancellation method to counteract various interferences and noises.

In said partial multi-access interference cancellation method, during array processing, the received weight vector of the array forms directional beam with its main lobe pointing to the place around the expected user, thereby greatly suppressing the interference user signal from other directions. It can be asserted that, in $$Y_i(j) = \sum_{k=1}^{N} w_{ik} x_k(j) = W_i^H X(j),$$

only when the interference user is located near the expected user, can there be strong interference user component; the component of the interference user signal far away from the expected user is very weak. When $Y_i(j)$ is used to perform parallel interference cancellation for all active users, as a large number of interference user signal components have already been pre-suppressed, the estimation for the regeneration signal of most interference users is not very accurate, therefore, the estimation for the multi-access interference of the expected user is not very accurate either, which will even worsen the primary demodulation result of the expected user in serious case. For this reason, the partial multi-access interference method is used so as to, on the one hand, avoid the inaccurate interference estimation due to extremely weak interference components from worsening the performance of the system, on the other hand, greatly reducing the number of interference users for practical cancellation, and decreasing the calculation amount of the system.

When distinguishing the strong and weak interference users, first, array output $Y_i(j)$ is used to perform matched filtering for all active users to get primary soft decision variable for all active users:

$$Z_i(j) = \sum_{l=1}^{P} c_i((j-1)P+l) \cdot Y_i(j), i = 1, \ldots, M$$

Provided $k^{th}$ user is the expected user of this receiving channel, then it is strong interference user if $$\frac{|Z_i(j)|}{|Z_k(j)|} \geq \rho, i \neq k$$

is satisfied, and interference cancellation needs to be performed, wherein $0<\rho<1$ is the pre-set threshold for distinguishing strong and weak interference user signals.

Step 26, calculating the downlink weight value according to the obtained uplink weight value.

For the CDMA system using TDD duplex, uplink signal and downlink signal work at the same frequency point and pass through the same channel, and the interval between sending time and receiving time is just several millisecond, so the characteristics of the uplink and downlink channels can be regarded as constant. Therefore, the uplink weight value can be used for the downlink weight value directly, only needing to get the conjugate of the uplink weight value and multiply it with the correction weight value, as such, the user receiving space information is converted into being represented by user transmitting space.

For the CDMA system using FDD duplex, the transmissions of the uplink and downlink are separated through frequency, with the uplink and the downlink occupying different frequencies. Since the fast fading resulted from multipath transmission depends on the frequency, the fast fading coefficients corresponding to FDD uplink and downlink are irrelative. So the uplink weight value can not be used for the downlink weight value directly, and certain conversion is needed.

In order to further clarify the above processing, DS-CDMA system in AWGN channel will be used as an example for description. Considering the receiving processing of a sector in a cell, provided that an uniform linear array with M antenna elements is adopted in each sector, in which there are N active users, the processing gain of the system is G, and N users in the sector are all far field signal sources for the base station antenna array, then the received signal of the $k^{th}$ element by the base station antenna array at the moment t ($j^{th}$ source symbol) is:

$$x_k = \sum_{i=1}^{N} \sqrt{2E_i}\, b_i(j) c_i((j-1)G+l) a_k(\theta_i) + n_k(t)\ k = 1, \ldots, M$$

wherein:

$E_i$ represents the energy of each spread spectrum code-chip after the source symbol of $i^{th}$ user is performed spectrum spread;

$b_i(j)$ represents the value of $j^{th}$ source symbol of $i^{th}$ user, which is +1 or −1;

$c_i((j-1)P+l), l=1, \ldots, G$ represents the first spread spectrum code-chip of $j^{th}$ source symbol of $i^{th}$ user;

$a_k(\theta_i)$ represents $k^{th}$ component of the direction vector $a(\theta_i)$ of the base station antenna array of $i^{th}$ user; wherein a $$(\theta_i) = [1, e^{j\phi}, e^{j2\phi}, \ldots, e^{j(N-1)\phi}]^T, \phi = \frac{d\sin(\theta_i)}{\lambda}2\pi,$$

d is the spacing of the uniform linear array element, λ is carrier frequency, $n_k(t)$ represents the AWGN of $k^{th}$ element.

$$\text{Thus, } X(j) = [x_1(j), x_2(j), \ldots, x_M(j)]^T$$
$$= \sum_{i=1}^{N} \sqrt{2E_k}\, b_i(j)c_i((j-1)G+l)a_k + n(j)$$

represents the output of one snapshot of the whole array. Provided the receiving weight vector of $i^{th}$ user is $W_i=[w_{i1}, w_{i2}, \ldots, w_{iM}]^T$, then the array output signal of $i^{th}$ user is:

$$Y_i(j) = \sum_{k=1}^{M} w_{ik}x_k(j) = W_i^H X(j)$$

$Y_i(j)$ is used to perform demodulation decision for $i^{th}$ user. $Y_i(j)$ is directly performed Matched filtering to get:

$$Z_i(j) = \sum_{l=1}^{P} c_i((j-1)G+l) \cdot Y_i(j) = D_i(j) + I_i(j) + n_i(j)$$

wherein, $D_i(j)=Pb_i(j)\sqrt{2E_i}a_i$ represents the expected signal component in matched filtering output.

$$I_i(j) = \sum_{l=1}^{P} c_i((j-1)G+l) \cdot \sum_{k \neq i} \sqrt{2E_k}\, b_k(j)c_k((j-1)G+l)a_k$$

represents the multi-user interference component in the receiving channel of $i^{th}$ user. $n_i(j)$ represents the AWGN in the receiving channel of $i^{th}$ user.

When performing array processing, it is to estimate $a_i(j)$ as accurate as possible, so as to make the main lobe of the pattern of the receiving array directs at the arrival direction of the expected user, and realize restraining the interference user signal by relatively low side-lobe. The parallel interference cancellation is mainly to estimate the estimated value $I_i(j)$ of multi-access interference component in $Z_i(j)$ as exactly as possible, and subtract it from the received signal to get purer receiving signals of the expected user. The soft decision variable of the expected user is $D_i(j)=Z_i(j)-I_i(j)$, and the corresponding demodulation output bit is $b_i(j)=\text{sign}(D_i(j))$.

Similarly, the above processing process can also be easily applied to other noise environments. The array pattern is also not limited to the uniform linear array, the arrays of other forms, such as non-uniform array, circle array, arc-shape array etc., can easily be generalized.

Based on the above, the invention improves the limitation of application environment of one single adaptive beam forming algorithm, extends the application range of the smart antenna in communication environment, and can trace the rapid movement of users in real time, and resist various interference environments. Meanwhile, if the system architecture based on software radio is used, this invention will not need relatively large hardware cost compared with the conventional smart antenna, thereby promoting the performance-price ratio of the smart antenna system.

To sum up, the smart antenna technique advanced in the invention is a mean that can effectively overcome the characteristic of time-varying of the channel. The corresponding adaptive beam forming method is selected through decisions for different channels, or multi-user detection method is added, so as to satisfy the communication demands under different environments, and promote communication quality.

INDUSTRIAL APPLICABILITY

The method of the present invention can be used to implement smart antenna system. It greatly promotes the performance-price ratio of smart antenna base station system with relatively low hardware cost, makes the engineering easy to implement, and greatly improves the processing performance of the smart base station.

What we claim is:

1. A method for implementing WCDMA system smart antenna, comprising the steps of:
    (a) processing signals received by an antenna array in a radio frequency channel to get baseband array data including a plurality of components;
    (b) estimating and identifying a channel environment according to eigenvalues of correlation matrix and an in-band power spectrum deviation of said array data, determining a channel type related to the channel environment to which the channel belongs currently based on a set decision criterions for the channel type; wherein in said decision criterion for channel type, channel types are divided into the following three kinds or any combination thereof: first, Additive White Gaussian Noise is a main part of interference, the environment located in is far away from a base station, and a signal power is weak and noise is strong; second, co-channel interference is a main part of interference, the environment located in is interfered by a co-channel from other cells; third, inter symbol interference is a main part of interference, the environment located in has severe inter symbol interference due to a great difference of time delays between each of multi-path components;
    (c) selecting a corresponding adaptive beam forming algorithm in real time according to an identification result of the channel type, calculating an uplink weight value; wherein in selecting the corresponding adaptive beam forming algorithm according to the identification result of the channel type, the following three criterions are followed:
    for the first channel type with Additive White Gaussian Noise being the main part of interference, a Maximal Ratio Combing beam forming algorithm is adopted;
    for the second channel type with co-channel interference being the main part of interference, an Advanced Constant Modulus algorithm (CAM) for beam funning is adopted, wherein an original weight value of CMA, $W_0=(X \cdot X^H)^{-1} \cdot X \cdot d^H$, is obtained according to a Wiener solution, wherein d is a reference signal, and X is the signal received by the antenna array, a cost function of an implementation method of steepest-descending Constant Modulus is: $J=E\{||w^H(n)x(n)|-|\alpha||^2\}$, $\alpha=W_0^H \cdot X(0)$, and an update direction selection iterative formula is $w(n+1)=w(n)-\mu x(n)e^*(n)$, $e(n)=2[y(n)-y(n)/|y(n)|]$, wherein μ is the step length, y(n) is the beam formed by said array data and said uplink weight value;

for the third channel type with inter symbol interference being the main part of interference, an advanced concatenated recursive beam forming algorithm is adopted;

(d) multiplying said array data and said uplink weight value to form a beam.

2. The method for implementing smart antenna of claim 1, wherein said decision criterion for channel type determines the channel type according to in-band power spectrum deviation and eigenvalue of correlation matrix of said array data, said decision criterion includes any combination of the following three or at least two criterions:

if the number of effective eigenvalues is 1, and the in-band power spectrum deviation is small, it is said first channel type;

if the number of effective eigenvalues is 1, and the in-band power spectrum deviation is large, it is said second channel type;

if the number of effective eigenvalues is larger than 1, and the in-band power spectrum deviation is small, it is said third channel type.

3. The method for implementing smart antenna of claim 2, wherein when said in-band power deviation is larger than a set threshold, the in-band power deviation will be considered to be relatively large, otherwise, it will be considered to be relatively small.

4. The method for implementing smart antenna of claim 2, wherein step (d) is followed by step (e): selecting a corresponding multi-user detection algorithm in real time to process the data after the beam is formed according to the identification result of the channel type, and completing distinction of users.

5. The method for implementing smart antenna of claim 2, wherein the decision criterion for the channel type set in said step (a) further includes a fourth channel type: there are various interferences and noises, the environment located in is complex communication environment with strong noise and both co-channel interference and inter symbol interference, its corresponding decision condition is: the number of effective eigenvalues is greater than 1, and the in-band power deviation is large; in said step (c) of selecting the corresponding adaptive beam forming algorithm according to the identification result of the channel type, pilot-bits assisted beam forming algorithm is adopted for said fourth channel type.

6. The method for implementing smart antenna of claim 1, wherein step (d) is followed by step (e): selecting a corresponding multi-user detection algorithm in real time to process the data after the beam is formed according to the identification result of the channel type, and completing distinction of users.

7. The method for implementing smart antenna of claim 6, wherein in said step (e) of selecting the corresponding multiusers detection algorithm according to the identification result of the channel type, any combination of the following four or at least two criterions is followed:

for the first channel type with Additive White Gaussian Noise being the main part of interference, minimum mean square based multi-user detection method is adopted;

for the second channel type with co-channel interference being the main part of interference, de-correlation detection method is adopted;

for the third channel type with inter symbol interference being the main part of interference, parallel interference counteraction method is adopted.

8. The method for implementing smart antenna of claim 6, wherein said step (e) is followed by a step (f): calculating a downlink weight value according to the obtained uplink weight value.

9. The method for implementing smart antenna of claim 1, wherein the decision criterion for the channel type set in said step (a) further includes a fourth channel type: there are various interferences and noises, the environment located in is complex communication environment with strong noise and both co-channel interference and inter symbol interference, its corresponding decision condition is: the number of effective eigenvalues is greater than 1, and the in-band power deviation is large; in said step (c) of selecting the corresponding adaptive beam forming algorithm according to the identification result of the channel type, pilot-bits assisted beam forming algorithm is adopted for said fourth channel type.

10. The method for implementing smart antenna of claim 9, wherein said step (d) is followed by a step (e): selecting a corresponding multi-user detection algorithm in real time to process the data after the beam is fowled according to the identification result of the channel type, and completing the distinction of users; and for the fourth channel type with various interferences and noises, partial multi-access interference cancellation method is used as multi-user detection algorithm.

11. The method for implementing smart antenna of claim 9, wherein when said in-band power deviation is larger than a set threshold, the in-band power deviation will be considered to be relatively large, otherwise, it will be considered to be relatively small.

12. The method for implementing smart antenna of claim 1, wherein step (d) is followed by step (e): selecting a corresponding multi-user detection algorithm in real time to process the data after the beam is formed according to the identification result of the channel type, and completing distinction of users.

13. The method for implementing smart antenna of claim 1 wherein step (d) is followed by step (e): selecting a corresponding multi-user detection algorithm in real time to process the data after the beam is formed according to the identification result of the channel type, and completing distinction of users.

14. The method for implementing smart antenna of claim 1, wherein the decision criterion for the channel type set in said step (a) further includes a fourth channel type: there are various interferences and noises, the environment located in is complex communication environment with strong noise and both co-channel interference and inter symbol interference, its corresponding decision condition is: the number of effective eigenvalues is greater than 1, and the in-band power deviation is large; in said step (c) of selecting the corresponding adaptive beam forming algorithm according to the identification result of the channel type, pilot-bits assisted beam forming algorithm is adopted for said fourth channel type.

15. A smart antenna device for WCDMA system, including an array antenna, a radio frequency (RF) channel module, and a beam forming module for forming the beam after weighting each of single channel signals, characterized in that a channel environment detection and classification module, a beam forming algorithm selection and a weight value generation module are further included, wherein:

said channel environment detection and classification module is used to estimate and identify a channel environment according to eigenvalues of correlation matrix and an in-band power spectrum deviation of baseband array data received from said RF channel, to determine a current channel type related to the channel environment, and output an identification result to said beam forming algorithm selection and weight value generation module; wherein channel types are divided into the following three kinds or any combination thereof: first, Additive White Gaussian Noise is a main part of interference, the environment located in is far away from a base station, a signal power is weak and noise is strong; second, co-channel interference is a main part of interference, the environment located in is interfered by a co-channel from other cells; third, inter symbol interference is a main part of interference, the environment located in has severe inter symbol interference due to a great difference of time delays between each of multi-path components;

said beam forming algorithm selection and weight value generation module is used to select a corresponding beam forming algorithm according to the identification result of channel type, to calculate a new uplink weight value according to said array data and feedback of beam forming signal, and send the new uplink weight value to said beam forming module wherein in selecting the corresponding adaptive beam forming algorithm according to the identification result of the channel type, the following three criterions are followed:

for the first channel type with Additive White Gaussian Noise being the main part of interference, a Maximal Ratio Combing beam forming algorithm is adopted;

for the second channel type with co-channel interference being the main part of interference, an Advanced Constant Modulus algorithm (CAM) for beam forming is adopted, wherein an original weight value of CMA, $W_0 = (X \cdot X^H)^{-1} \cdot X \cdot d^H$, is obtained according to Wiener solution, wherein d is reference signal, and X is the signal received by the antenna array, a cost function of an implementation method of steepest-descending Constant Modulus is: $J = E\{\|w^H(n)x(n)| - |\alpha|\|^2\}$, $\alpha = W_0^H \cdot X(0)$, and an update direction selection iterative formula is $w(n+1) = w(n) - \mu x(n)e^*(n)$, $e(n) = 2[y(n) - y(n)/|y(n)|]$, wherein $\mu$ is the step length, y(n) is the beam formed by said array data and said uplink weight value;

for the third channel type with inter symbol interference being the main part of interference, an advanced concatenated recursive beam forming algorithm is adopted.

16. The smart antenna device of claim 15, characterized in further including a multi-user detection module, used to select corresponding multi-user detection algorithm according to the identification result of said channel type to process said beam forming signal, and complete the distinction of users.

17. The smart antenna device of claim 16, wherein said channel environment detection and classification module further includes: an eigenvalue calculation unit, for calculating eigenvalue of correlation matrix of the array data and counting the number of the effective eigenvalues; an in-band power spectrum deviation calculation unit, for estimating the power of each channel of the signals received by the array and calculating in-band power spectrum deviation; and a channel type decision unit, for identifying the type that the channel belongs to currently by a set decision criterion according to the number of the effective eigenvalues and the in-band power spectrum deviation.

18. The smart antenna device of claim 15, wherein said channel environment detection and classification module further includes: an eigenvalue calculation unit, for calculating eigenvalue of correlation matrix of the array data and counting the number of the effective eigenvalues; an in-band power spectrum deviation calculation unit, for estimating the power of each channel of the signals received by the array and calculating in-band power spectrum deviation; and a channel type decision unit, for identifying the type that the channel belongs to currently by a set decision criterion according to the number of the effective eigenvalues and the in-band power spectrum deviation.

19. The smart antenna device of claim 18, wherein when said channel type decision unit identifies the type that the channel belongs to currently according to the number of the effective eigenvalues and the in-band power spectrum deviation, any combination of the following three or at least two criterions is followed:

if the number of effective eigenvalues is 1, and the in-band power spectrum deviation is small, it is said first channel type;

if the number of effective eigenvalues is 1, and the in-band power spectrum deviation is large, it is said second channel type;

if the number of effective eigenvalues is larger than 1, and the in-band power spectrum deviation is small, it is said third channel type.

20. The smart antenna device of claim 19, wherein when said channel type decision unit identifies the type that the channel belongs to currently according to the number of the effective eigenvalues and the in-band power spectrum deviation, it follows the following criterions:

the number of the effective eigenvalues is greater than 1, and the in-band power deviation is large, it is the fourth channel type, in which, there are various interferences and noises, the environment located in is complex communication environment with strong noise and both co-channel interference and inter symbol interference;

when said multi-user detection module selects the corresponding multi-user detection algorithm according to the identification result of the channel type, partial multi-access interference cancellation method is used for the fourth channel type.

21. The smart antenna device of claim 20, wherein when said channel type decision unit determines that said in-band power deviation is larger than a set threshold, the in-band power deviation is considered to be relatively large, otherwise, it is considered to be relatively small.

22. The smart antenna device of claim 19, wherein when said channel type decision unit determines that said in-band power deviation is larger than a set threshold, the in-band power deviation is considered to be relatively large, otherwise, it is considered to be relatively small.

* * * * *